United States Patent [19]

Beyer

[11] Patent Number: 4,643,632

[45] Date of Patent: Feb. 17, 1987

[54] OVERLOAD SAFETY DEVICE

[75] Inventor: Hasso Beyer, Augsburg, Fed. Rep. of Germany

[73] Assignee: EKE Robotersysteme GmbH, Fed. Rep. of Germany

[21] Appl. No.: 721,638

[22] Filed: Apr. 10, 1985

[30] Foreign Application Priority Data

Apr. 13, 1984 [DE] Fed. Rep. of Germany ....... 3414067

[51] Int. Cl.⁴ ............................................. B25J 19/00
[52] U.S. Cl. ..................................... 414/730; 901/49
[58] Field of Search .................. 414/730; 901/49, 29, 901/30, 34; 403/2, 146, 147, 229, 220; 267/158, 161, 177, 175, 162, 172; 248/548, 900; 74/89.15, 99 A, 110

[56] References Cited

U.S. PATENT DOCUMENTS 2,724,996 11/1955 O'Shei ........................... 248/900 X
4,540,331 9/1985 Stanner et al. ...................... 414/730

FOREIGN PATENT DOCUMENTS 3025952 2/1982 Fed. Rep. of Germany ... 901/49 X
560086 6/1977 U.S.S.R. ............................. 267/172

Primary Examiner—Terrance L. Siemens
Attorney, Agent, or Firm—Hill, Van Santen, Steadman & Simpson

[57] ABSTRACT

Overload safety device, particularly for an industrial robot having a robot arm and a robot tool and preferably arrangeable between the robot arm and the robot tool, with a robot flange, and a tool flange, the latter being movable relative to the former, wherein the robot flange and the tool flange sealingly cooperate in a sealing area subject to the action of a pressure medium and that a safety cut-out can be triggered by a pressure drop in the pressure medium.

8 Claims, 4 Drawing Figures

OVERLOAD SAFETY DEVICE

BACKGROUND OF THE INVENTION

The invention relates to an overload safety device, particularly for industrial robots having a robot arm and a robot tool, preferably arrangable between the robot arm. and the robot tool, with a robot flange and a tool flange, the latter being movable relative to the former.

Working machines, particularly industrial robots often have to move relatively bulky, large or heavy articles at a considerable speed. There is always a risk that, particularly in the case of projecting workpieces, due to the movements extending well beyond the basic dimensions of the industrial robot, contacts or collisions with other workpieces, machines or similar objects in the path of movement will occur. It has therefore become standard practice to fit between the tool and the robot arm an overload safety device of the aforementioned type, which simultaneously constitutes a "predetermined breaking point".

In the case of an industrial robot, the maximum weight of a load which can be moved with said robot at a given input power decreases with increasing lever arm, i.e. with increasing robot arm width. In addition, the robot arm weight reduces the "working load" of the industrial robot. Thus, on the basis of these standpoints, in connection with an overload safety device of the present type there are framework requirements for a minimum axial extension or construction depth and a minimum weight.

In the case of one known overload safety device, an electrical proximity switch is located in the robot flange and is positioned at a certain distance from the tool flange. On modifying the distance between the tool flange and the robot flange, the electrical proximity switch responds and triggers a safety cut-out. This known overload safety device construction is unsatisfactory in connection with the aforementioned requirements concerning a minimum constructional depth and a minimum weight. The electrical proximity switch has a by no means inconsiderable length and contributes significantly to the total weight of the overload safety device. Furthermore, the freedom of movement of the tool flange in the known overload safety device is very limited, because it is constructed around the relatively elongated electrical proximity switch. However, without such a comprehensive construction, the constructional depth of this known overload safety device would be further considerably increased. The tool flange construction embracing the proximity switch can very easily lead to the overload safety device being damaged in the case of certain stresses to the industrial robot, such as those linked with a tilting movement of the tool flange. This leads to a limited possibility of use of the overload safety device.

As electrical switching elements, the proximity switches can also fail as a result of an electrical fault, it generally then being necessary to replace a proximity switch. If it is not the proximity switch which is faulty, the electrical leads can be damaged, particularly in the case of a continuously moving industrial robot.

The problem of the invention is therefore to provide an overload safety device, which has a minimum construction depth and minimum weight, which can be more widely used and is simultaneously more reliable.

SUMMARY OF THE INVENTION

This problem is initially and essentially solved in that the robot flanges and the tool flange sealingly cooperate in a sealing area subject to the action of a pressure medium and that a safety cut-out can be released or triggered by a pressure drop in the pressure medium.

Thus, the construction according to the invention gives an overload safety device, where there is no need for an electrical proximity switch. According to the invention, the spacing of the tool flange and the robot flange is checked by a simple sealing area between these two flanges, which only requires limited constructional effort and expenditure and in particular only has a limited constructional depth. The constructional measures necessary for this sealing area also lead to a definite decrease in the overload safety device weight. They essentially only comprise recesses, in which travel the sealing medium and in which are mounted sealing lips. It is a further important advantage that the overload safety device according to the invention requires much less maintenance. In the case of the aforementioned overload safety device, it is possible for there to be e.g. a failure of the electrical proximity switch. As the latter is fixed within the robot flange, it is necessary to disassemble the complete overload safety device to permit replacement of the proximity switch.

The term "pressure medium" is to be understood in its widest possible sense beyond the scope of the present invention. This need not be a pressure medium used as such, such as e.g. oil, gas, water, etc and the successful result according to the invention is also achieved by a flexible line carrying the pressure medium.

If, in accordance with a preferred embodiment, compressed air is used as the pressure medium, the further advantages obtained in connection with the present overload safety device that there is a blowing-out action on releasing said device. The pressurized air escapes on releasing the overload safety device substantially radially and blows away any dust particles or the like in the vicinity of the sealing area. As a result, no dust or the like can be deposited in the then open sealing area, which would reduce the sealing action.

A further shortcoming of the known overload safety device is a lack of adaptability of the release load. The tool flange is mounted on the robot flange by means of a compression spring, which is supported on the one and on a mounting bolt supporting flange and on the other hand on a supporting flange of the robot flange and permits a relative movement between tool flange and robot flange only as from a certain loading. If there is a change in the permissible load or stress, such as through the industrial robot or working machine having to move objects having a different weight or different dimensions, an adaptation of the overload safety device can only be brought about by replacing the compression spring. However, in the case of the known overload safety device, this involves considerable effort and leads to a long idle time.

According to a further teaching of the invention having independent significance, this shortcoming is overcome in that the mounting bolt is axially displaceable in the tool flange and is adjustably mounted in accordance with an initial stressing force which is to be selected. This mounting can be carried out in different ways, the Expert being e.g. aware of the fact that the end of the mounting bolt associated with the tool flange can be provided with a thread and that the axial position of the bolt can be adjusted by means of two nuts which can be braced against one another. A preferred construction of this axially displaceable mounting support is described in greater detail hereinafter.

The teaching according to the invention of making the tool flange and robot flange sealingly cooperate in a sealing area, also permits tilting movements of the tool flange with respect to the robot flange. As an adaptation to these movement possibilities, according to a further development of the invention, the bolt supporting flange has a spherical segmental construction in its bearing area and cooperates with a correspondingly constructed bearing ring, on which the compression spring rests. A displacement of the mounting bolt from its axial position then leads to a ball and socket joint-like movement of the bearing ring on the bearing area. In this case, the axes of the mounting bolt and the compression spring which can coincide in the normal position form an angle with one another.

The axially displaceable and adjustable mounting of the mounting bolt is preferably realised in that on the tool side of the tool flange, the retaining bolt has an adjusting head equipped with a lift surface and that there is a radially movable adjusting element provided with an aduusting face complementary to the lift surface and which cooperates with the adjusting head for the axial displacement of the mounting bolt. The radial arrangement of the adjusting element permits an adjustability of the retaining bolt, whilst having a minimum effect on the constructional depth of the overload safety device. The setting elements are also very easily accessible from the outside, without it requiring the disassembly of the tool for the purpose of adjusting or resetting the mounting bolt. In the case of an already realised overload safety device, there are two adjusting elements, which cooperate with two adjusting faces of the retaining bolt, the adjusting faces being constructed in a cross-head of the mounting bolt, which consequently has an overall T-shaped configuration.

In order to ensure a reliable response of the overload safety device even in the case of torsional stresses, i.e. stresses which only attempt to turn the tool flange relative to the robot flange, according to a further feature of the invention on the tool flange side the robot flange has at least one rejector cam and that on the robot flange side the tool flange has a corresponding recess. It has proved to be particularly advantageous to construct the rejector cam as a rejector cylinder and arrange it in such a way that a longitudinal axis of said cylinder is oriented to a centre point of the robot flange. Particular significance is also attached to the measure of making the rejector cylinder diameter slightly larger than the recess, so that a clearly defined, secure support position is obtained, which is largely insensitive to the action of wear.

Another measure which reduces wear also has advantages with regards to an easy response of the overload safety device. According to this measure, the rejector cylinder is arranged in slightly "countersunk" manner in e.g. the robot flange. In other words, the effective rejector face of the rejector cylinder has a smaller circumferential extension than corresponds to $\pi r$, r being the radius of a cross-sectional circle of the rejector cylinder. This simultaneously leads to a wedge effect of the rejector cylinder, which will be described in greater detail hereinafter.

Even though the aforementioned advantages are already obtained when there is only a single rejector cam, according to a practical construction there are several rejector cams or cylinders, which are arranged in an asymmetrical manner. In the case of a symmetrical distribution, on turning the tool flange relative to the robot flange, the latter could "snap back" into its initial position which, as a function of the tool, might not be desired.

Fundamentally, the rejector cams can be provided both in the robot flange and in the tool flange, the corresponding recesses being provided in the in each case other flange. However, preferably, the reactor cylinders are arranged in the robot flange and the corresponding recesses in the tool flange. This is recommended in that the tool flange is always movable relative to the robot flange. The described rejector cam construction is also advantageous from the manufacturing standpoint. A recess is to be machined both into the tool flange and into the robot flange, so that a rejector cylinder is fitted therein and secures the normal reciprocal positioning of the flanges. This cylindrical recess can be machined in the case of a joint clamping of the flanges, e.g. by drilling, which ensures that the necessary recesses are located at angularly precisely coinciding points in the tool flange and the robot flange.

With respect to the aforementioned teaching of constructing the robot flange and the tool flange so as to sealingly cooperate with a sealing area, according to a special development, the sealing area is sealed by sealing lips embedded in the tool flange, although in principle it would be possible to reverse this so that the sealing lips were embedded in the robot flange. The sealing lips are held in the tool flange in grooves, which cross-sectionally taper towards the tool flange surface. For example, this can be brought about by a groove which is straight on the one side and undercut on the other, so thatthe sealing lips are effectively and simply secured.

On the robot side, the sealing area comprises a groove carrying the pressure medium. In the sealing state, this groove is sealed by two sealing lips in each case running along either side. The pressure medium is taken from a pressure medium line in the industrial robot, which is normally under a relatively high pressure. As the level of the pressure of the pressure medium in the sealing area is of virtually no significance for the overload safety device, according to further preferred developments the feed line to the sealing area has a restrictor and the safety cut-out is arranged behind the latter in the pressure medium flow direction and is in operative connection with the feed line. Thus, the safety cut-out is only subject to a limited pressure and consequently requires no special constructional expenditure and effort.

The invention is described in greater detail hereinafter relative to a non-limitative embodiment and the attached drawings, wherein show:

DESCRIPTION OF THE PREFERRED EMBODIMENT

Figure 1:
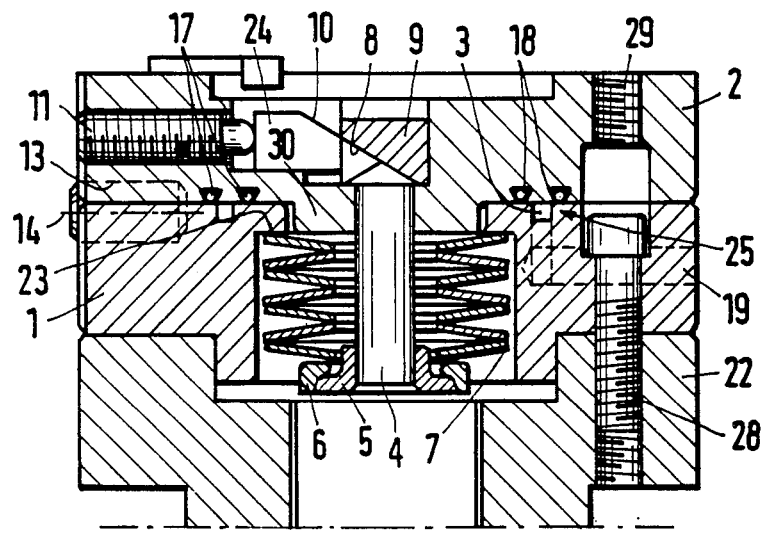
FIG. 1 a cross-section through an overload safety device according to the invention.

An overload safety device, particularly intended for use in an industrial robot is represented and described. The overload safety device essentially comprises a robot flange 1 and a tool flange 2, which sealingly cooperate in a sealing area 3 subject to the action of a pressure medium. A safety cut-out can be released by a pressure drop in the pressure medium.

In the case of an industrial robot, such as overload safety device is placed between a robot arm and a tool, in order to bring about a disconnection of the industrial robot if the weights or stresses are inadmissibly high. In the case of the overload safety device of FIG. 1, it is possible to see a connecting flange 22 of the robot arm, whilst the tool is not shown.

The tool flange 2, to which the tool is flanged in the operating state, is movable relative to robot flange 1 namely by bracing tool flange 2 against robot flange 1 by means of a compression spring 7. In the case of an inadmissibly high load, i.e. exceeding the initial stressing force in compression spring 7, the tool flange 2 rises from robot flange 1 and in the sealing area 3 a pressure drop occurs, so that the safety cut-out 21 responds (cf FIG. 3).

As can be seen in detail in FIG. 1, the compression spring 7 is on the one hand supported on a bolt supporting flange 5 of a mounting bolt 4, which is guided in axially movable manner in the tool flange 2, and on the other hand on a supporting flange 23 of robot flange 1. The axial position of mounting bolt 4 can be modified with the aid of an adjusting element 11, which is a ranged radially to mounting bolt 4. The adjusting element 11 is provided with an external thread and the bore in tool flange 2, which receives the adjusting element, is provided with a corresponding internal thread. Thus, adjustment is brought about by a simple helical turning of adjusting element 11. In the construction shown in FIG. 1, there is a lift surface head 24 separate from the adjusting element 11 and which is only radially displaceable, whereas the adjusting element 11 is rotatable as a result of the aforementioned thread guidance. Fundamentally, the adjusting element 11 could also be constructed in one piece, by giving a conical construction to the head cooperating with the adjusting head 9 of mounting bolt 4. The particular advantage of the radially arranged adjusting element 11 is that a resetting or adaptation to modified conditions of compression spring 7 can take place with the tool fitted.

Adjusting head 9 of mounting bolt 4 has lift surfaces 8, which cooperate with the lift surface head 24, on which are provided the adjusting faces 10. It can be seen that both the lift surfaces 8 and the adjusting faces 10 slope with respect to the axis of mounting bolt 4. As can in particular be gathered from FIG. 2, head 9 has two spaced lift surfaces 8, which are located in the T-shaped adjusting head 9, in each case laterally of the shank of the mounting bolt 4. Correspondingly, these two lift surfaces 8 cooperate with an adjusting element 11 or a lift surface head 24.

As can be gathered from closer examination of FIG. 1 in connection with the bolt supporting flange 5, compression spring 7 only rests indirectly on said flange 5. It is directly supported on a bearing ring 6 which, in its area cooperating with flange 5, is constructed in spherical segmental form corresponding thereto. The bolt supporting flange 5 and the bearing ring 6 cooperate with one another in ball and socket joint manner, so that it is possible for the axes of mounting bolt 4 and compression spring 7 to diverge.

In order to bring about a raising of tool flange 2 from robot flange 1 when there is only a torsional stressing of the industrial robot tool, the rejector cylinders 12 are fixed in robot flange 1 and on the same rests the tool flange 2. Recesses 13 are provided in tool flange 2 corresponding to rejector cylinders 12.

Figure 2:
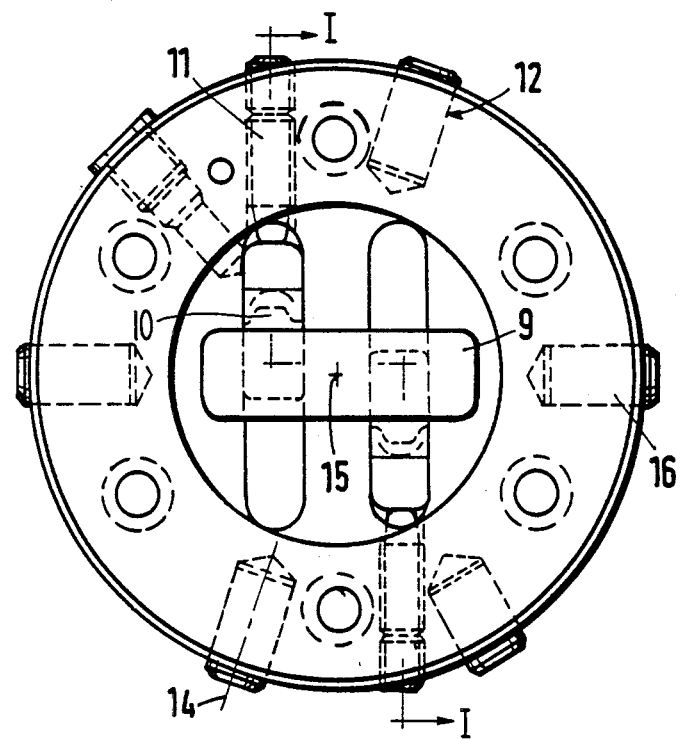
FIG. 2 a plan view of the object of FIG. 1.

As can be gathered from FIG. 2, there are five rejector cylinders 12 in this embodiment and these are arranged asymmetrically, but their longitudinal axes 14 are in each case oriented on the centre 15 of robot flange 1. In principle, the result according to the invention can also be achieved with fewer rejector cylinders. When only three rejector cylinders 12 are provided, the tool flange 2 rests in centered manner on robot flange 1. In the case of a smaller number of rejector cylinders 12, a separate centering measure is necessary, e.g. by rounding the seat 30 of tool flange 2 in robot flange 1, whereas in the case of the embodiment, cf FIG. 1, the tool flange 2 is not in contact with robot flange 1 in the vicinity of seat 30.

Figure 4:
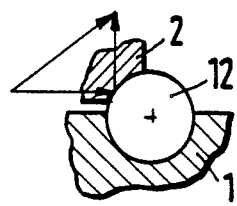
FIG. 4 is a fragmentary sectional view of a rejector cylinder and a diagrammatic force diagram.

As a further feature in FIG. 1 and particularly in FIG. 4, the rejector cylinders 12 are embedded more deeply in robot flange 1 than would correspond to a "symmetrical" mounting, although this "asymmetry" is shown in an exaggerated manner for clarification purposes in FIGS. 1 and 4. A slightly deeper embedding is in fact adequate. This asymetrical mounting of the rejector cylinders 12 is particularly important for a completely satisfactory raising of tool flange 2, especially in the case of torsional stressing. This is made clear by the triangle of force shown in FIG. 4, which indicates that the resulting force attempts to directly raise tool flange 2. The drawing in of the triangle of force directly above the gap between the tool flange 2 and the robot flange 1 does not mean that the tool flange 2 only rests on a rejector cylinder 12 in this area. Despite the "larger diameter" measure described hereinafter, the tool flange 2 in fact largely rests directly on a rejector cylinder 12. The aforementioned asymmetrical mounting also leads to a wedge action of the rejector cylinder 12. The latter are mounted in robot flange 11, e.g. by means of a screwed connection, which is no shown.

In the case of the described lower mounting of the rejector cylinders 12 in tool flange 1, initially the effective rejector surface 16 of rejector cylinder 12 with the corresponding recess 13 in tool flange 2 would no longer be in contact or would only be in contact on one side with tool flange 2 in the normal position. Thus, the rejector cylinders 12 are given a somewhat larger diameter than the recesses 13 or the corresponding recesses in robot flange 1. It is also important thatthe rejector cylinders 12, cf FIG. 2, are arranged in asymmetrically distributed manner, which leads to the advantage described hereinbefore.

The sealing area 3 comprises sealing lips 17, which are mounted in grooves 18.and a pressure medium groove 25 whereby, as can be seen in FIG. 1 in the case of sealing engagement between tool flange 2 and robot flange 1, closure is provided on both sides by sealing lips 17. It is particularly advantageous to construct grooves 18, which cross-sectionally taper towards the surface of tool flange 12. As can also be seen in FIG. 1, groove 18 is undercut on one side for this purpose.

A particular advantage of the overload safety device according to the invention is that the robot flange 1 is only exposed to very limited mechanical stresses, particularly as a result of the rejector cylinders 12, which are inserted as separate parts in robot flange 1. This makes it possible to give relative freedom regarding the material of robot flange 1, permitting e.g. the choice of a light material, particularly a light metal, such as aluminium, which once again leads to a considerable weight saving.

Figure 3:
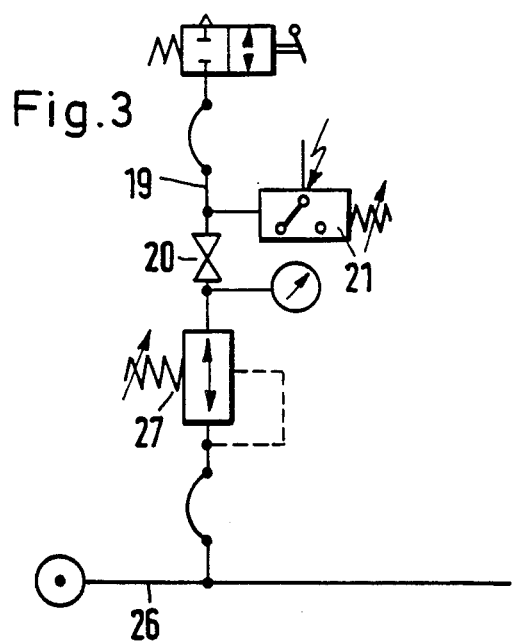
FIG. 3 a sketch through a pressure medium circuit diagram.

Finally, FIG. 3 shows a circuit diagram for the pressure medium, the sealing area 3 being symbolically shown in the sealing state. It is important that the pressure medium is removed by a pressure medium line 26 in the industrial robot and that between the said line 26 and the feed line 19 is provided a pressure regulating valve 27, which keeps the pressure constant on the outlet side, and a restrictor 20, so that a relatively low pressure can be set in feed line 19. This also leads to the advantage that on triggering the safety cut-out an excessive amount of pressure medium is not discharged from the overload safety device. As can be seen in FIG. 3, the safety cut-out is connected to feed line 19, i.e. is exposed to a relatively low pressure.

Restrictor 20 is preferably constructed in such a way that, in the stable state, it only permits the passage of a pressure medium quantity slightly less than the quantity passing out of the sealing area in thestable state. This ensures the minimum escape of pressure medium in the operating state. This measure simultaneously leads to a considerable "sensitivity" of the overload safety device. Even in the case of a much higher pressure medium discharge in the sealing area than would correspond to normal leakage losses, the overload safety device responds.

On particular importance within the scope of the invention is the special construction of the tool flange 2 and robot flange 1 in the vicinity of the fastening screws. As can in particular be gathered from FIG. 1, fastening screws are provided for fixing robot flange 1 to connection flange 22. In addition, a tool of the industrial ro.bot, which is not shown in the drawing, can be screwed to tool flange 2. The necessary tapped bores 29 are located coaxially to the tapped bores for the fastening screws 28. If a tool has not yet been screwed to the tool flange 2 of the overload safety device, as is shown e.g. in FIG. 1, the fastening screws 28 can be tightened or loosened through bores 29.

The inventive features described in the description drawings and claims can, either singly or in random combinations, be essential to the construction of the various embodiments of the invention.

I claim:

1. An overload safety device, particularly for an industrial robot having a robot arm and a robot tool and preferably arrangable between the robot arm and the robot tool, with a robot flange, and a tool flange, the latter being movable relative to the former, characterized in that the robot flange (1) and the tool flange (2) sealingly cooperate in a sealing area (3) subject to the action of a pressure medium and that a safety cut-out can be triggered by a pressure drop in the pressure medium;

said tool flange being mounted on the robot flange by means of a compression spring, which is on the one hand supported on a supporting flange of a mounting bolt and on the other hand on the supporting flange of the robot flange, the mounting bolt (4) being axially displaceable in the tool flange (2) and is adjustably mounted in accordance with an initial stressing force to be selected;

wherein the mounting bolt (4) on the tool side of the tool flange (2), has an adjusting head (9) equipped with a lift surface (8), whilst a radially movable adjusting element (11) cooperating with the adjusting head (9) and provided with an adjusting face (10) constructed in complementary manner to the lift surface (8) is used for the axial displacement of the mounting bolt (4);

the robot flange (1) has on the tool flange side at least one rejector cam (12) and the tool has on the robot flange side a corresponding recess (13); and the rejector cam (12) includes a rejector cylinder (12) and the longitudinal axis (14) of the latter is aligned with a centre point (15) of robot flange (1).

2. An overload safety device according to claim 1, characterized in that in its bearing region, the bolt supporting flange (5) is constructed in a spherical segmental manner and cooperates with a correspondingly constructed bearing ring (6) on which rests the compression spring (7).

3. An overload safety device according to claim 1, characterized in that an effective rejector surface (16) of rejector cylinder (12) has a smaller circumferential extension that $\pi r$, r being the radius of a cross-sectional circle of rejector cylinder (12).

4. An overload safety device according to claim 1 characterized in that the rejector cylinder (12) has a slightly larger diameter than the associated cylindrical recess (13) of tool flange (2).

5. An overload safety device according to claim 1 characterized in that several rejector cams or cylinders (12) are provided and that they are arranged in an asymmetrically distributed manner.

6. An overload safety device according to one of the claims 1 or 2, characterized in that the sealing of the sealing area (3) is brought about by sealing lips (17) embedded in the tool flange (2).

7. An overload safety device according to claim 6, characterized in that the tool flange (2) has grooves (18) for the mounting of the sealing lip (17) and that the grooves (18) cross-sectionally taper towards the surface of tool flange (2).

8. An overload safety device according to one of the claims 1 or 2, the industrial robot having a pressure medium line with optionally a relatively high pressure, characterized in that a feed line (19) to the sealing area (3) has a resistor (20) and that a safety cut-out (21) is positioned behind the restrictor (20) in the pressure medium flow direction and is operatively connected to feed line (19).

* * * * *